United States Patent [19]
Ozu et al.

[11] Patent Number: 4,867,713
[45] Date of Patent: Sep. 19, 1989

[54] ELECTRICAL CONNECTOR

[75] Inventors: Tokio Ozu, Akigawa; Taturou Oda, Mie; Akira Ogawa, Kuwana, all of Japan

[73] Assignee: Kabushiki Kaisha Toshiba, Kawasaki, Japan

[21] Appl. No.: 159,333

[22] Filed: Feb. 23, 1988

[30] Foreign Application Priority Data

Feb. 24, 1987 [JP] Japan .............................. 62-26580[U]
Feb. 26, 1987 [JP] Japan .............................. 62-27587[U]

[51] Int. Cl.$^4$ .............................................. H01R 4/48
[52] U.S. Cl. .................................... 439/833; 439/843; 439/564
[58] Field of Search ........ 439/816, 819, 827, 830–833, 439/839, 842, 843, 845, 847, 849, 850, 856, 857

[56] References Cited

U.S. PATENT DOCUMENTS 2,665,415 1/1954 Kojis .................................... 439/833
4,331,375 5/1982 Takamatsu ..................... 339/210 R

FOREIGN PATENT DOCUMENTS 2626210 1/1977 Fed. Rep. of Germany ...... 439/833
1157370 5/1958 France ................................. 439/833
2007131 1/1970 France ................................. 439/833
1030894 7/1983 U.S.S.R. ............................. 439/833

Primary Examiner—David Pirlot
Attorney, Agent, or Firm—Foley & Lardner, Schwartz, Jeffery, Schwaab, Mack, Blumenthal & Evans

[57] ABSTRACT

The disclosure relates to an electrical connector employed to make and break an electric motor main circuit between the control unit side and the side of the box-shaped frame of a control center. The electrical connector includes a male contact, a female contact having a pair of contact strips engaged with and disengaged from the male contact and a end section to which a connecting conductor is connected. A pair of conductive strips of the connecting conductor extends at the outside of the contact strips of the female contact in an opposite relation to the same. The conductive strips of the connecting conductor are coupled by a regulating rod which prevents the outward movement of the conductive strips. The female contact and the connecting conductor are integrated and enclosed in a cavity of an insulating case for oscillation. The contact pressure between the male and female contacts is increased by an electromagentic repulsive force induced between the contact strips of the female contact and the connecting conductor.

1 Claim, 6 Drawing Sheets

ELECTRICAL CONNECTOR

BACKGROUND OF THE INVENTION

1. Field of the Invention

The present invention relates generally to electrical connectors suitable for use in control centers including a plurality of control units mounted on a box-shaped frame so that a plurality of electric motors are controlled, and more particularly to the electrical connector having male and female contacts for making and breaking motor main circuits between the control unit side and the box-shaped frame side.

2. Description of the Prior Art

A first embodiment of conventional electrical connector of the above-described type is shown in FIGS. 15 and 16. Reference numeral 1 indicates three vertical buses, for respective phases, for example. Female contacts 2 are provided so as to correspond to the respective vertical buses 1. Each female contact 2 includes an end section 2a and a pair of contact strips 2b extending from respective edges of the end section 2a in an opposite relation with each other. Each connecting conductor 3 is bent to a slender triangular configuration. An end section 3a of the connecting conductor 3 is secured to the end section 2a of the female connector 2 by rivet 4 so that a pair of conductive strips 3b forming generally U-shaped leg portions extend at the outside of the pair of contact strips 2b in a nearly opposite relation therewith. Terminal portions 5 are formed at the distal edges of the conductive strips 3b. Connection wires 6 are connected to the terminal portions 5. The female contact 2 and the connecting conductor 3 integrated therewith are inserted and secured in a cavity 7a formed in a split insulating case 7 so that the outer surface of the conductive strip 3b of the connecting conductor 3 closely abuts on the inside of the cavity 7a. The insulating case 7 is mounted on the backside end of the control unit (not shown).

Where an overcurrent such as short-circuit current flows from the vertical bus 1 into the female contact 2, an electromagnetic force is induced between the contact strips 2b when the short-circuit current flows through the contact strips 2b in the direction of the end section 2a. Since the short-circuit current further flows from the end section 3a of the connecting conductor 3 through the conductive strips 3b in the direction of the terminal portions 5, an electromagnetic repulsive force is induced between the conductive strips 3b and the contact strips 2b. Thus, the electromagnetic attractive and repulsive forces effectively act so that the connection between the contact strips 2b and the vertical bus 1 is held.

However, since the female contact 2 and the connecting conductor 3 integrated therewith are secured in the cavity 7a of the insulating case 7 with the conductive strips 3b closely abutting on the inside of the cavity 7a, the female contact 2 cannot be allowed to move in the cavity 7a. Accordingly, when the female contact 2 is to be connected to the vertical bus 1, the centers of the end openings of three female contacts 3 are required to be exactly aligned with the centers of the corresponding vertical buses 1 simultaneously. Otherwise, it would be difficult to connect the female contacts 2 to the corresponding vertical buses 1.

FIG. 17 illustrates a second embodiment of the conventional electrical connector. A pair of plate-shaped connecting conductors 8 are provided at the outside of the contact strips 2b of the female contact 2 so as to be nearly opposed thereto. The connecting conductors 8 are connected to the end section side of the contact strips 2a by means of rivets 9. The terminal portions 10 similar to the terminal portion 5 are provided at respective edges of the connecting conductor 8. The female contact 2 and the connecting conductor 8 integrated therewith are provided in the cavity 7a of the insulating case 7 so that spaces are formed between the connecting conductor 8 and the inner walls of the cavity 7.

In accordance with the second embodiment of the conventional electrical connector, the connection of the female contacts 2 to the corresponding vertical buses 1 are rendered easier since the spaces at the outside of the connecting conductor 8 allow the female contact 2 and the connecting conductor 8 integrated therewith to move in the cavity 7a. However, when the short-circuit current flows through the female contact 2, for example, the electro-magnetic repulsive force induced between the contact strips 2b of the female contact 2 and the connecting conductor 8 causes the connecting conductor 8 to be displaced outwardly. The electromagnetic repulsive force does not act to bias the contact strips 2b against the vertical bus 1 effectively. Consequently, the electro-magnetic forces induced between the contact strips 2b and the vertical bus 1 owing to the short-circuit current cause the contact strips 2b to be disconnected from the vertical bus 1.

SUMMARY OF THE INVENTION

Therefore, a primary object of the invention is to provide an electrical connector wherein the female contacts are connected to the male contacts with ease.

A second object of the present invention is to provide an electrical connector wherein disconnection of the female contacts from the male contacts can be prevented when the overcurrent such as short-circuit current flows through the male and female contacts.

A third object of the present invention is to provide an electrical connector wherein the overcurrent, when occurring, is dispersed to nearly overall area of the female contact.

In view of the above-described objects and others, the electrical connector in accordance with a first aspect of the present invention comprises a male contact, a female contact having an end section and a pair of contact strips extending from respective edges of the end section in an opposite relation so as to be engaged with and disengaged from the male contact, a connecting conductor having a pair of conductive strips connected to the female contact at an end section thereof and extending at the outside of the pair of contact strips in nearly opposite relation therewith, the connecting conductor having terminal portions at the respective edges of the conductive strips, and a regulating member provided across the pair of conductive strips so as to prevent each of the conductive strips from being moved outwardly. The female contact and the connecting conductor integrated therewith are provided in a cavity formed in an insulating case for oscillatory movement therein.

When the electromagnetic forces act between the pair of contact strips of the female contact and the pair of conductive strips of the connecting conductor as the result of the current flow, the conductive strips of the connecting conductor are prevented from being moved outwardly by the regulating member. The electromagnetic repulsive force thus causes the contact strips of the female contact to be biased against the male contact, thereby securing the connection between the male and female contacts. Furthermore, since the female contact and the connecting conductor are integrally provided in in the cavity formed in the insulating case for oscillatory movement therein, the female contact may be connected to the male contact with ease.

According to a second aspect of this invention, each of contact strips of the female contact is provided with a slit extending in its lengthwise direction. Each contact strip is thus bifurcated by the slit. An overcurrent, when occurring, is distributed by way of two portions of the contact strips bifurcated by the slit, thereby preventing the concentration of the overcurrent. Consequently, the electromagnetic repulsive force acting so as to break the contacts may be reduced and accordingly, the connection between the contact strips of the female contact and the male contact may be maintained in desirable condition.

DESCRIPTION OF PREFERRED EMBODIMENTS

FIGS. 1-10 illustrate a first embodiment wherein the present invention is applied to a disconnector employed in a control center.

Figure 1:
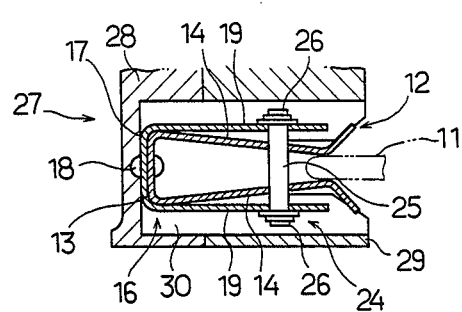
FIG. 1 is an enlarged sectional view of the electrical connector of an embodiment taken along line I—I in FIG. 8.
Figure 2:
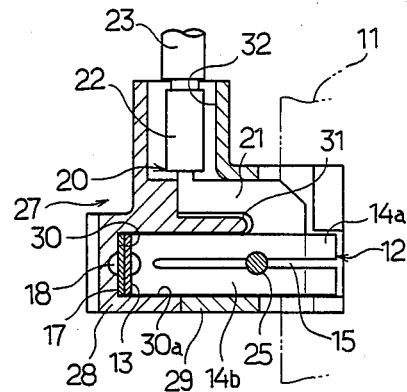
FIG. 2 is an enlarged sectional view taken along line II—II in FIG. 6.

Referring first to FIGS. 1-4, reference numeral 11 indicates a three-phase vertical bus for the power supply. The vertical bus 11 serves as a male contact. The disposition of the vertical bus 11 will hereinafter be described with reference to FIG. 9. One edge of the vertical bus 11 is formed into an arc configuration. A female contact 12 is provided so as to be engaged with and disengaged from the male contact 11. The female contact 12 includes an end section 13 and a pair of contact strips 14 extending from respective edges of the end section 13 in an opposite relation. The end portion of each contact strip 14 opposed to the end section 13 is bent angularly outwardly. Each contact strip 14 is provided with an elongated slit 15 formed in its lengthwise direction such that each contact strip 14 is divided into an upper portion 14a and a lower portion 14b. A connecting conductor 16 includes an end section 17 connected by a rivet 18 to the end section 13 of the female contact 12 and a pair of conductive strips 19 extending from respective edges of the end section 17 at the outside of the pair of contact strips 14 in a nearly opposite relation therewith. Terminal portions 20 are provided on both ends of the conductive strips 19, respectively. As shown in FIG. 2, each terminal portion 20 includes a generally L-shaped conductive portion 21 extending from the upper portion of each conductive strip 19 and a connecting tube 22 provided at the edge of the conductive portion 21. One end of connection wires 23 are connected to the connecting tube 22 by means of pressurization. A regulating member 24 comprises a coupling rod 25 provided across each conductive strip 19 of the connecting conductor 16 and each contact strip 14 of the female contact 12 and stopper means 26 such as an E-shaped retaining ring attached to both ends of the coupling rod 25 respectively. The regulating member 24 serves to prevent the pair of coductive strips 19 from being moved outwardly and to allow the same to be moved inwardly.

Referring now to FIGS. 5-9, reference numeral 27 indicates an insulating case 27 comprising a first split case 28 and a second split case 29. The front side 28a of the first split case 28 is joined to the backside 29a of the second split case 29. The insulating case 27 is provided with a cavity 30 having an opening at the front side. The female contact 12 and the connecting conductor 16 integrated therewith are enclosed within the cavity 30. As shown in FIG. 2, the lower portions of the connecting conductor 16 and the female contact 12 are received on the bottom wall 30a of the cavity 30 and the upper end portions thereof abut against a guide 31 projecting from the first split case 28, thereby preventing the female contact 12 and the connecting conductor 16 integrated therewith from moving vertically. Whereas, spaces are provided between the conductive strips 19 of the connecting conductor 16 and both side walls of the cavity 30, respectively. Accordingly, the female contact 12 and the connecting conductor 16 integrated therewith are allowed to move horizontally or rotationally such that the pair of contact strips 14 of the female contact 12 may be engaged with the male contact 11 with ease even when the male and female contacts 11 and 12 are deviated from the respective correct positions opposed to each other. The insulating case 27 is provided with a terminal enclosure 32 in which the connecting tube 22 of the terminal portions 20 and the connection wires 23 are enclosed. A recess 33 is formed by cutting away part of the second split case 29 for the insertion of the vertical bus 11 thereinto.

Figure 9:
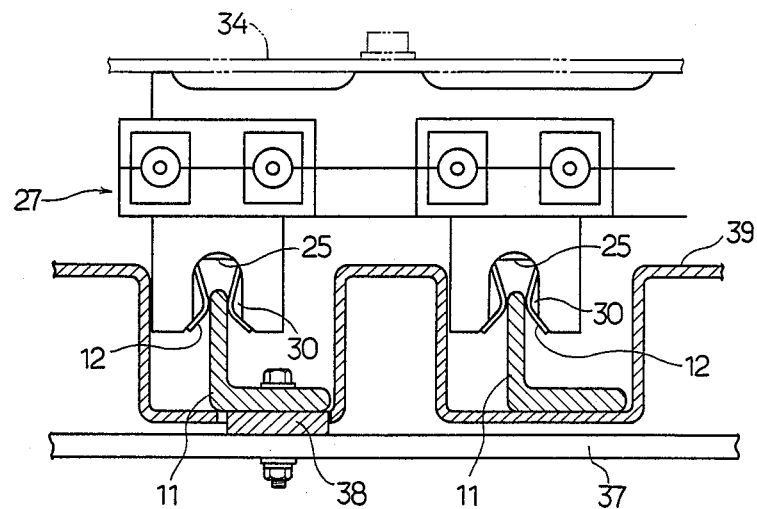
FIG. 9 is a view for explaining the connection of vertical buses to horizontal buses.
Figure 10:
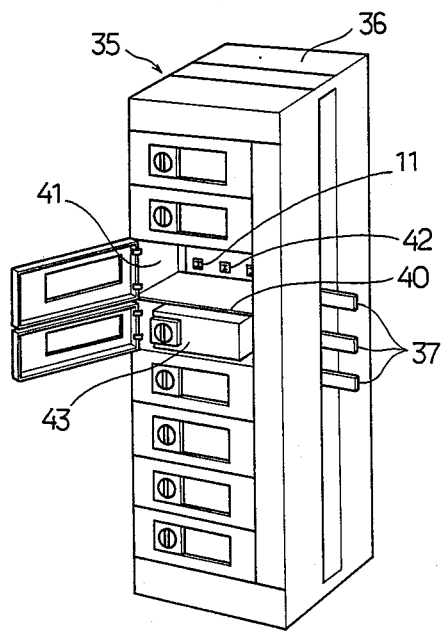
FIG. 10 is a perspective view of a control center.

Referring to FIGS. 9 and 10, horizontal buses 37 are attached to a box-shaped frame of a control center 35. The vertical bus 11 having a generally L-shaped transverse section is secured to each horizontal bus 37 by means of screw and nut with a spacer 38 formed of a conductive material interposed therebetween. Reference numeral 39 indicates insulating covers for the vertical buses 12. The inner space of the control center 35 is divided into a plurality of unit compartments 41 by a plurality of shelves 40 disposed horizontally, as shown in FIG. 10. Each unit compartment 41 has openings 42 formed in a backside wall thereof so that the vertical bus 11 is exposed to and faces the unit compartment 41. A control unit 43 is provided in each unit compartment 41 so as to be able to be taken in and out thereof. The control unit 43 includes control devices such as a circuit breaker and a control relay as in the case of conventional control units. The insulating case 27 enclosing the female contact 12 and the connecting conductor 16 integrated therewith in the cavity 30 is attached to a backside plate 34 of the unit compartment 41. Each vertical bus 11 is connected to a three-phase AC power source (not shown).

The operation of the electrical connector will now be described. Referring to FIGS. 1-4 and 10, three female contacts 12 are inserted and connected to the corresponding vertical buses 11 when the control unit 43 with the insulating case 27 is taken into the unit compartment 41. In this case, even when the inclined edge of the contact strip 14 abuts against the edge of the vertical bus 11 as the result of deviation of the center of the female contact 12 from the center of the vertical bus 11, further thrust of the contact strips 14 causes the vertical bus 11 to be inserted between the contact strips 14 of the female contact 12 since the female contact 12 and the connecting conductor 16 integrated therewith are allowed to oscillate in the cavity 30.

Figure 3:
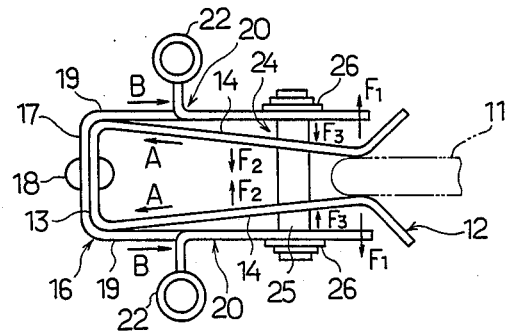
FIG. 3 is a plan view of a female contact and connecting conductor integrated therewith.
Figure 4:
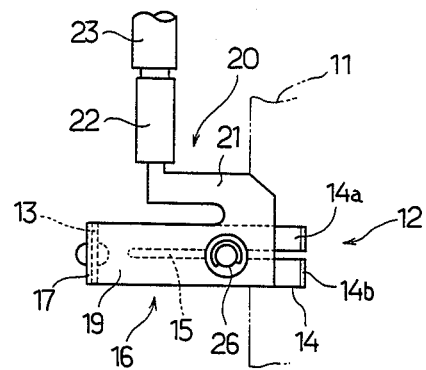
FIG. 4 is a side view of the female contact and the connecting conductor integrated therewith.
Figure 5:
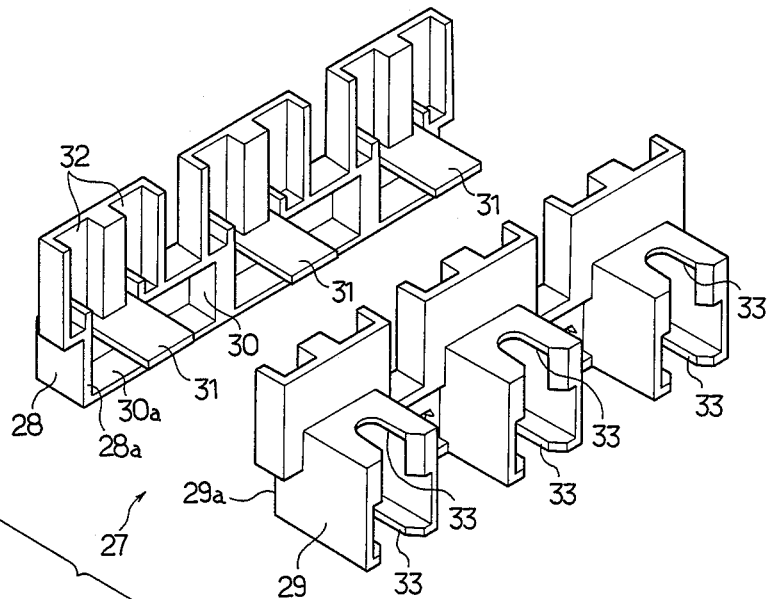
FIG. 5 is an exploded perspective view of an insulating case.
Figure 6:
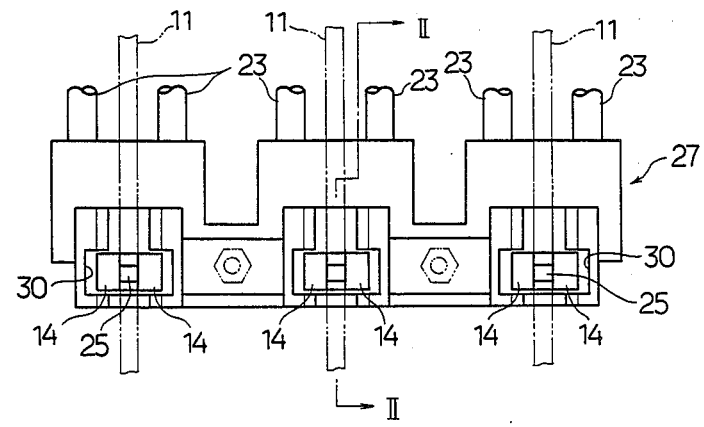
FIG. 6 is a front view of the insulating case.
Figure 7:
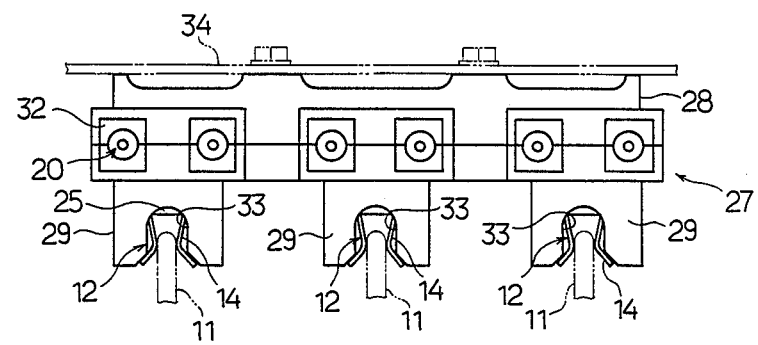
FIG. 7 is a plan view of the insulating case.
Figure 8:
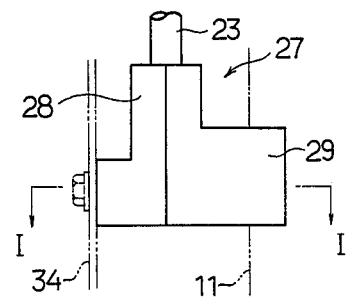
FIG. 8 is a side view of the insulating case.

In the event that a current flows into a load through the contact strips 14 of the female contact 12 engaged with the vertical bus 11 as shown by arrows A in FIG. 3, the flow of current is distributed by way of the upper and lower portions 14a and 14b of each contact strip 14 of the female contact 12. The current further flows from the edge of the female contact 12 through the end section 17 and the conductive strips 19 of the connecting conductor 16. From the edges of the connecting conductor 16, the current further flows through the conductive portion 21 of the terminal portions 20 and the connecting tube 22 into the connection wires 23 as shown by arrows B in FIG. 3.

When the current flows through the female contact 12, the following forces are induced:

(1) A force F1 acts between the vertical bus 11 and the contact strips 14 of the female contact 12. The force F1 is proportional to the current acting to disengage the contact strips 14 from the vertical bus 11.

(2) A force F2 acts so that the contact strips 14 attract each other, as the result of the current flow through the contact strips 14 of the female contact 11 in the direction of arrows A.

(3) A force F3 acts between the conductive strips 19 and the contact strips 14 so as to repulse them as the result of the current flow through the conductive strips 19 in the direction of arrows B.

The conductive strips 19 are likely to be displaced outwardly under the influence of the force F3. The conductive strips 19 are prevented from being moved outwardly by the regulating member 24. Consequently, the force F3 acts to bias the contact strips 14 against the vertical bus 11.

As described above, the contact strips 14 are biased against the vertical bus 11 by the force presented as (F2, +F3, −F1). Consequently, the connection between the contact strips 14 and the vertical bus 11 is not broken even when the short-circuit current flows therethrough.

According to the electrical connector of the above-described embodiment, the female contact 12 may be connected to the vertical bus 11 with ease as compared to the conventional electrical connector of the first embodiment since the female contact 12 and the connecting conductor 16 integrated therewith are enclosed in the cavity 30 of the insulating case 27 so as to be able to oscillate therein with the spaces provided between both sides of the connecting conductor 16 and the inside wall of the cavity 30. Additionally, since the conductive strips 19 of the connecting conductor 16 are prevented from being moved outwardly by the regulating member 24, the electromagnetic repulsive force F3 induced between the conductive strips 19 and the contact strips 14 of the female contact 12 effectively acts to bias the contact strips 14 against the vertical bus 11. Consequently, the connection between the contact strips 14 of the female contact 12 and the vertical bus 11 is not broken even when the short-circuit current flows through the male and female contacts 11 and 12.

Furthermore, each contact strip 14 of the female contact 12 is provided with the slit extending in its lengthwise direction so that the contact strip 14 is divided into upper and lower portions 14a and 14b. The short-circuit current, when flowing, is distributed to the upper and lower portions 14a and 14b of the contact strips 14, thereby preventing the concentration of the short-circuit current. Consequently, the electromagnetic repulsive force acting to break the contacts may be reduced, thereby further securing the connection between the contact strips 14 of the female contact 12 and the vertical bus 11.

Figure 11:
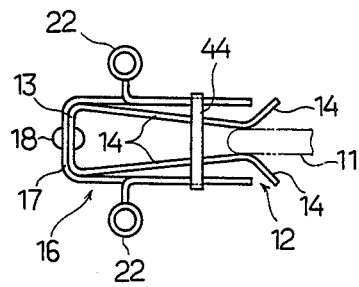
FIG. 11 is a view similar to FIG. 3 showing the electrical connector of a second embodiment.
Figure 12:
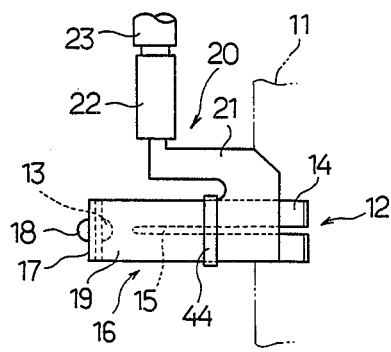
FIG. 12 is a view similar to FIG. 4 showing the electrical connector of the second embodiment.

FIGS. 11 and 12 illustrate a second embodiment of the present invention. Instead of the regulating member 24 in the first embodiment, a rectangular frame-shaped regulating member 44 is attached to the conductive strips 19 opposed to each other so as to surround the same. The same effect can be attained as in the first embodiment.

Figure 13:
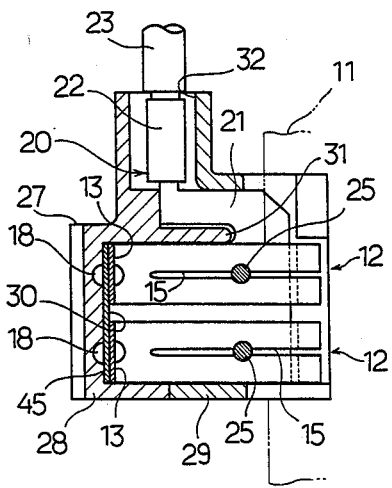
FIG. 13 is a view similar to FIG. 3 showing the electrical connector of a third embodiment.
Figure 14:
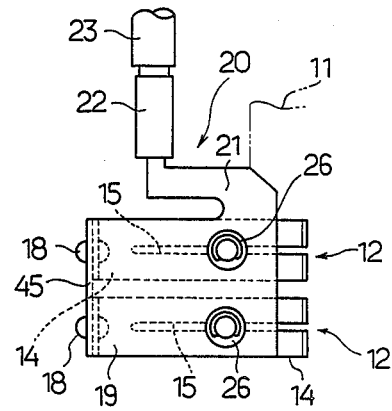
FIG. 14 is a view similar to FIG. 4 showing the electrical connector of the third embodiment.
Figure 15:
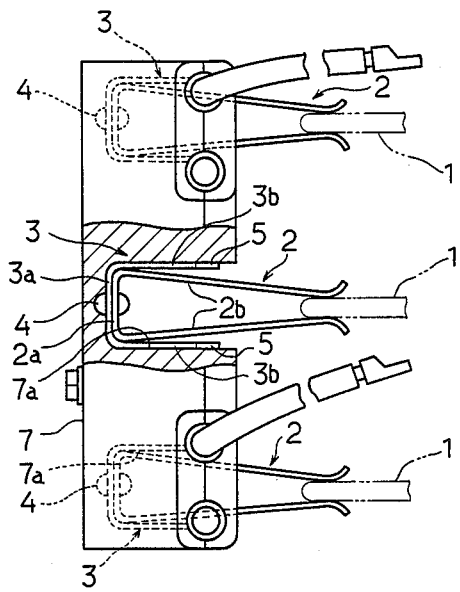
FIG. 15 a partially broken-away plan view of an electrical connector of a first embodiment in accordance with the prior art.
Figure 16:
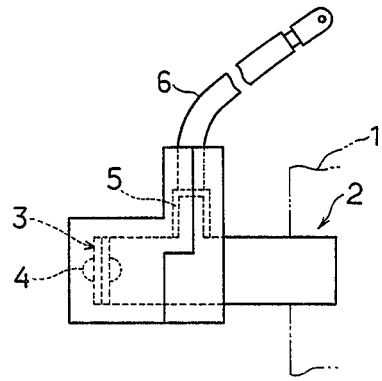
FIG. 16 is a side view of the electrical connector of the first embodiment in accordance with the prior art.
Figure 17:
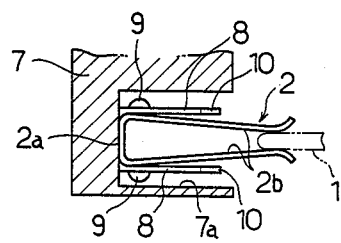
FIG. 17 is a transverse cross section of a major portion of an electrical connector of a second embodiment in accordance with the prior art.

FIGS. 13 and 14 illustrate a third embodiment of the invention. The connecting conductor employed in the third embodiment is approximately twice as high as the connecting conductor 16 in the first embodiment. The female contact 12 having the same dimension as that in the first embodiment is secured to an end section 45 of the connecting conductor by the rivets 18 which are vertically spaced from each other. Consequently, a current capacity of the connector may be increased.

The foregoing disclosure and drawings are merely illustrative of the principles of the present invention and are not to be interpreted in a limiting sense. The only limitation is to be determined from the scope of the appended claims.

What is claimed is:

1. An electrical connector utilizing electromagnetic repulsive force to increase contact pressure between a male and female contact, comprising:
   (a) a male contact;
   (b) a female contact having a pair of extended contact strips, said female contact being provided for engagement and disengagement with said male contact;
   (c) a connecting conductor connected to said female contact and having a pair of conductive strips extending in the general direction of the extended contact strips;

(d) an insulating case having a cavity for enclosing said female contact and said connecting conductor integrated therewith for oscillation therein; and (e) means for inducing an electromagnetic repulsive force between the contact strips of the female contact and the conductive strips of the connecting conductor, when current flows through the female contact and the connecting conductor, to increase contact pressure between the male contact and the contact strip of the female contact, the means including a regulating member engaging the pair of conductive strips of said connecting conductor so as to limit each of the conductive strips of said connecting conductor from being moved away from the male contact and so as to allow each of the conductive strips to be moved toward the male contact.

* * * * *